T. J. WILLIAMS.
GATE FASTENER.
APPLICATION FILED MAR. 4, 1912.
1,035,505.
Patented Aug. 13, 1912.
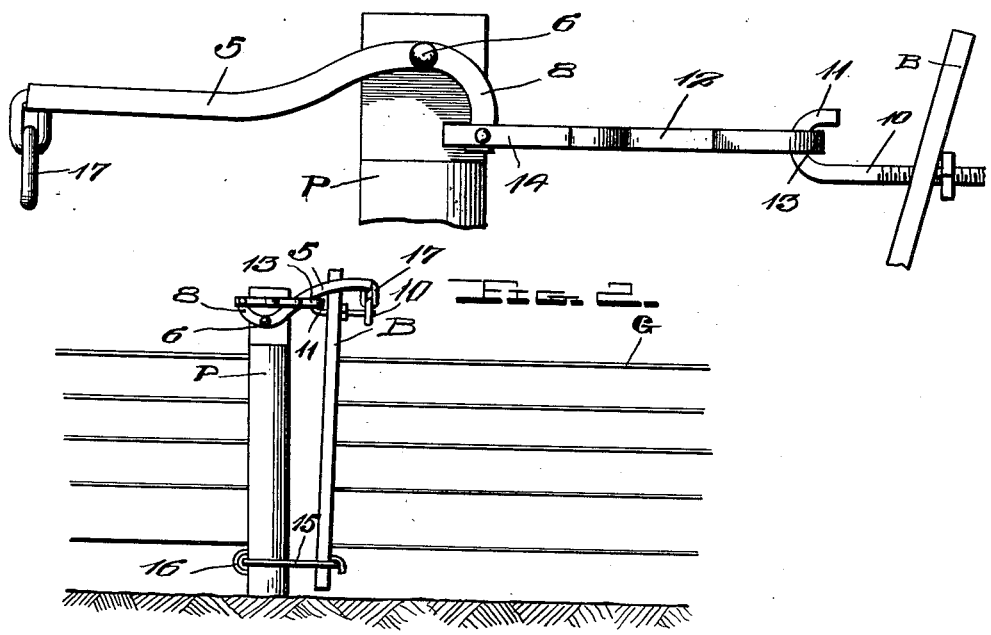
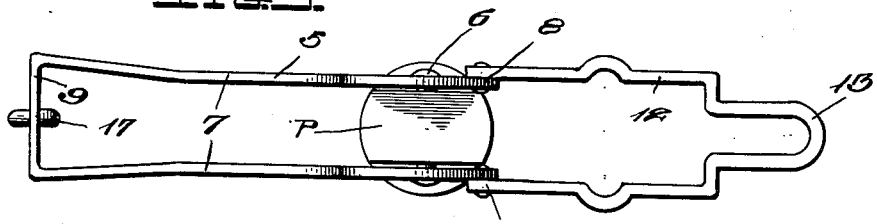
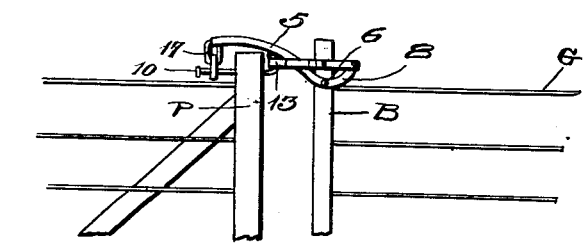
Witnesses
Chas. L. Griesbauer.
G. B. Norton.
Inventor
T. J. Williams,
By Watson E. Coleman
Attorney

UNITED STATES PATENT OFFICE.

THOMAS J. WILLIAMS, OF SHEFFIELD, IOWA.

GATE-FASTENER.

1,035,505.   Specification of Letters Patent.   Patented Aug. 13, 1912.

Application filed March 4, 1912. Serial No. 681,506.

*To all whom it may concern:*

Be it known that I, THOMAS J. WILLIAMS, a citizen of the United States, residing at Sheffield, in the county of Franklin and State of Iowa, have invented certain new and useful Improvements in Gate-Fasteners, of which the following is a specification, reference being had to the accompanying drawings.

This invention relates to improvements in gate fasteners and more particularly to a simple, efficient and durable device of this character which is particularly designed for application and use in connection with farm gates constructed of wire fencing whereby the gate is not only securely held in its closed position but the wires thereof are stretched or held taut.

Another object of the invention is to provide a fastener for the above purpose which may be inexpensively manufactured, easily and quickly applied or removed and can be readily operated to secure or release the gate.

With the above and other objects in view, the invention consists of the novel features of construction, combination and arrangement of parts hereinafter fully described and claimed, and illustrated in the accompanying drawings, in which—

Figure 1 is a side elevation of my improved gate fastener showing the same applied to a fence post; Fig. 2 is a similar view showing the positions of the parts when the gate is fastened; Fig. 3 is a top plan view thereof; and Fig. 4 is a side elevation illustrating a different application of the fastener.

Referring in detail to the drawing P designates the fence post to which the free end of the gate is adapted to be fastened.

G indicates the gate which includes the end bar B to which one of the ends of the wires W are secured. The other ends of these wires are connected to the other vertical gate bar which is mounted upon a hinged post (not shown) in any preferred manner.

The upper end of the fence post P is reduced in thickness and upon the same the elongated U-shaped lever 5 is mounted for pivotal movement upon the bolt 6 which is transversely disposed through the post. The parallel side bars 7 of this pivoted lever are curved or bent as indicated at 8, said curved ends of the bars being disposed adjacent to the fence post. The other portions of the arms extending upon the opposite side of the pivot bolt 6 are of considerably greater length so that the desired leverage necessary to close the gate is obtained. The intermediate connecting portion 9 of said lever provides a convenient handle which is adapted to be grasped to swing said lever as will be understood from the following description.

In the upper end of the gate bar B a bolt 10 is secured, and the end of this bolt which is disposed upon one side of the bar toward the fence post is provided with a hook 11. A U-shaped bar 12 is provided with an intermediate contracted looped portion 13 with which the hook 11 of the bolt 10 is adapted to be engaged. The ends of this U-shaped bar are pivotally connected to the hooked ends of the operating lever 5 as indicated at 14. A loop 15 embraces the lower end of the fence post and the gate bar, said loop being preferably hinged as at 16 to the post.

In the operation of my improved fastener as shown in Figs. 1 and 2, when it is desired to fasten the gate in its closed position, the operating lever 5 is swung upwardly from the position shown in Fig. 1 and over toward the gate. The lever is then forced downwardly so that the hooked ends thereof will be disposed upon the opposite side of the fence post as shown in Fig. 2 and the parallel arms of said operating lever disposed upon opposite sides of the upper end of the gate bar B. In this movement of said lever, it will be readily seen that by means of the U-shaped connecting bar 12, the upper end of the gate bar will be forced over toward the fence post until said bar is disposed in substantially parallel relation thereto, the lower end of said bar moving upon the loop 15. In this movement of the gate bar the wires of the gate will be tightly stretched and held taut. When the operating lever is in the position shown in Fig. 2, the transverse connecting portion 9 between the arms of said lever is disposed below the plane of the pivot 6 of the lever so that said lever will retain the position to which it has been moved until the same is forced upwardly to release the tension of the gate wires. The intermediate portion 9 of the operating lever 5 is provided with an opening for the attachment to said lever of a keeper loop 17. This loop is adapted to engage over the end of the bolt 10 or a nail driven into the upper end of the gate bar B when the gate is fastened to prevent accidental movement of the lever to its release position which might be caused by stock knocking against the wires or bar of the gate.

In Fig. 4 I have illustrated a slightly different arrangement of the parts wherein the operating lever is pivotally mounted upon the gate bar B instead of the post P while the bolt 10 to which the member 12 is connected is disposed through the upper end of said fence post. The operation of this form of the invention is precisely similar to that above described.

Either arrangement of the elements of the fastener may be employed to suit the convenience of the individual user.

While I have shown and described the preferred form and construction of the various parts, it will be obvious that the invention is susceptible of a great many modifications in the form, proportion and arrangement thereof without departing from the essential feature or sacrificing any of the advantages of the invention.

Having thus described the invention what is claimed is:—

The combination with a gate and a loop embracing the lower end of the gate bar and the fence post, of fastening means for said gate comprising a bolt fixed to the upper end of the gate bar and having a hook on one end, a U shaped bar provided with a loop in its intermediate portion to be engaged with the hooked end of said bolt, an operating lever of elongated U shaped form having its extremities curved and disposed upon opposite sides of the gate post, a pivot bolt disposed through the curved ends of said lever at an intermediate point and through the gate post, the extremities of said curved ends of the lever being pivotally connected to the ends of said U shaped bar, and a loop carried by said lever to engage over the other end of the bolt to hold said lever against pivotal movement and retain the gate bar in its fastened position.

In testimony whereof I hereunto affix my signature in the presence of two witnesses.

THOMAS J. WILLIAMS.

Witnesses:
MARGUERITE LOUGENE,
W. H. REYNOLDS.